United States Patent

[11] 3,588,842

[72] Inventor Robert K. Heldman
Naperville, Ill.

[21] Appl. No. 746,857
[22] Filed July 23, 1968
[45] Patented June 28, 1971
[73] Assignee GTE Automatic Electric Laboratories Incorporated

[54] RANDOM SETTING OF A SCANNER
3 Claims, 4 Drawing Figs.

[52] U.S. Cl. .......... 340/172.5
[51] Int. Cl. .......... G06f 7/10
[50] Field of Search .......... 340/168, 172.5; 235/157, 92; 179/18.21; 328/43

[56] References Cited

UNITED STATES PATENTS

| | | | |
|---|---|---|---|
| 3,119,097 | 1/1964 | Tullos | 340/168 |
| 2,860,286 | 11/1958 | Ost | 328/43 |
| 3,200,264 | 8/1965 | Lindenthal et al. | 235/92 |
| 3,217,145 | 11/1965 | Suski | 235/92 |
| 3,258,749 | 6/1966 | Jenkins | 235/92 |
| 3,328,534 | 6/1967 | Murphy et al. | 179/18.21 |
| 3,371,282 | 2/1968 | Vande Wege | 328/43 |

*Primary Examiner*—Paul J. Henon
*Assistant Examiner*—Mark Edward Nusbaum
*Attorneys*—K. Mullerheim, Cyril A. Krenzer and B. E. Franz

ABSTRACT: In a common-controlled communication switching system, the path scanner counter of the marker is set to a random starting point by loading it with a number derived from a terminal-number-register, using individual output bits of the register in no particular order with respect to the terminal number stored therein. Thus uniform usage of the available paths is obtained.

INVENTOR.
ROBERT K. HELDMAN
BY Bernard E. Franz
ATTY.

RANDOM SETTING OF A SCANNER

BACKGROUND OF THE INVENTION

1. Field of the Invention

This invention relates to a multistage counter used in a scanner, and more particularly to apparatus for setting the counter in a manner that provides a random starting point for each operation of the counter.

2. Description of the Prior Art

Many systems have several circuit units, which may be selected, one at a time, to perform certain functions or as interconnecting devices between two specific circuits. The selection of one of these circuit units may be accomplished by a scanner in conjunction with the idle-busy condition of the circuit units. The number of these units in use at any given time depends on the service demands. Generally systems are designed with a sufficient number of these circuits, so that only in extreme cases all or nearly all of the units are in use at one time. In the low-demand-for-service periods certain of the circuit units may be and are selected while others may remain idle and not be selected. Thus, the circuit units are not used uniformly, which is highly undesirable.

One example of a system using a scanner is described in U. S. Pat. No. 3,328,534 for a Communication Switching System. In that system a plurality of incoming trunks are connected through a cross-point network to register junctors or to outgoing trunks. The above system also includes a terminal-number register for identifying the terminal numbers of the incoming and outgoing trunks or registers. The terminal-number register comprises a plurality of bistable devices and stores the number in binary-coded-decimal form. The connection is completed to the cross-point network via a plurality of possible communication paths via which two trunks, or a trunk and a register junctor, can be connected. Since some of these plurality of possible paths may already be in use by other circuits, they are marked unavailable for this particular call. To select an idle path between the two designated circuits a path scanner having a counter is used. The counter used in the above system is disclosed in U.S. Pat. No. 3,371,282 for a Counting Arrangement. The counter, which employs bistable devices, has as many counts as there are possible paths between each inlet and outlet circuit. The counter outputs and path condition information are gated through respective coincidence gates. The counter upon activation enables these coincidence gates one-at-a-time, consecutively, and when the path condition input to the enabled gate indicates a path idle condition the counter is stopped and that path is selected for establishing a communication path.

If the counter were to start at any fixed point, certain of the paths would be used more often than the others; that is, the paths associated with the counts following the fixed starting point, if idle, would be selected first. Also, if the paths associated with the early counts are busy, it requires more time to select an idle path.

One way a uniform usage of the paths can be achieved is by starting the counter from the previous selection point. However, in the specific example, as in many other systems of this type, the counter is used for other operations, as in the aforementioned system, namely to check the links for correct contact closures. Upon completion of this operation the counter is reset to its idle state. Another way a uniform usage could be obtained is by setting the counter to a random starting point by running the counter free prior to scanning operation. However, due to the fixed time the counter is free running, this arrangement does not provide randomness of the starting point.

SUMMARY OF THE INVENTION

According to the invention the counter used in a scanner is set to a random starting point by loading it with a number derived from another register, using individual output bits (binary digits) of the register in an order which is meaningless with respect to the information stored therein. In said communication switching system, the terminal-number register may be used for this purpose. Each of the plurality of counter bistable devices is provided with input connections from the outputs of some of the terminal-number register bistable devices. These counter input connections are each gated via a coincidence gate. Each coincidence gate is also provided with an enabling connection common to all of the coincidence gates. Since, nearly every consecutive service demand has a different terminal number, the information signals on the connections between the terminal number register and the counter will vary accordingly. Prior to the scanning operation, the counter is supplied with an enabling signal to thereby change the state of each bistable device in accordance with the information on its associated connection from the terminal number register. Changing the state of the bistable devices in the counter provides the counter with a random starting point.

BRIEF DESCRIPTION OF THE DRAWINGS

Setting of the counter to a random starting point for each counter operation, according to the present invention, will be better understood with reference to the following detailed description and the accompanying drawings in which:

FIGS. 2 and 3 are to be arranged.

DESCRIPTION OF SIMPLIFIED EMBODIMENT

Figure 1:
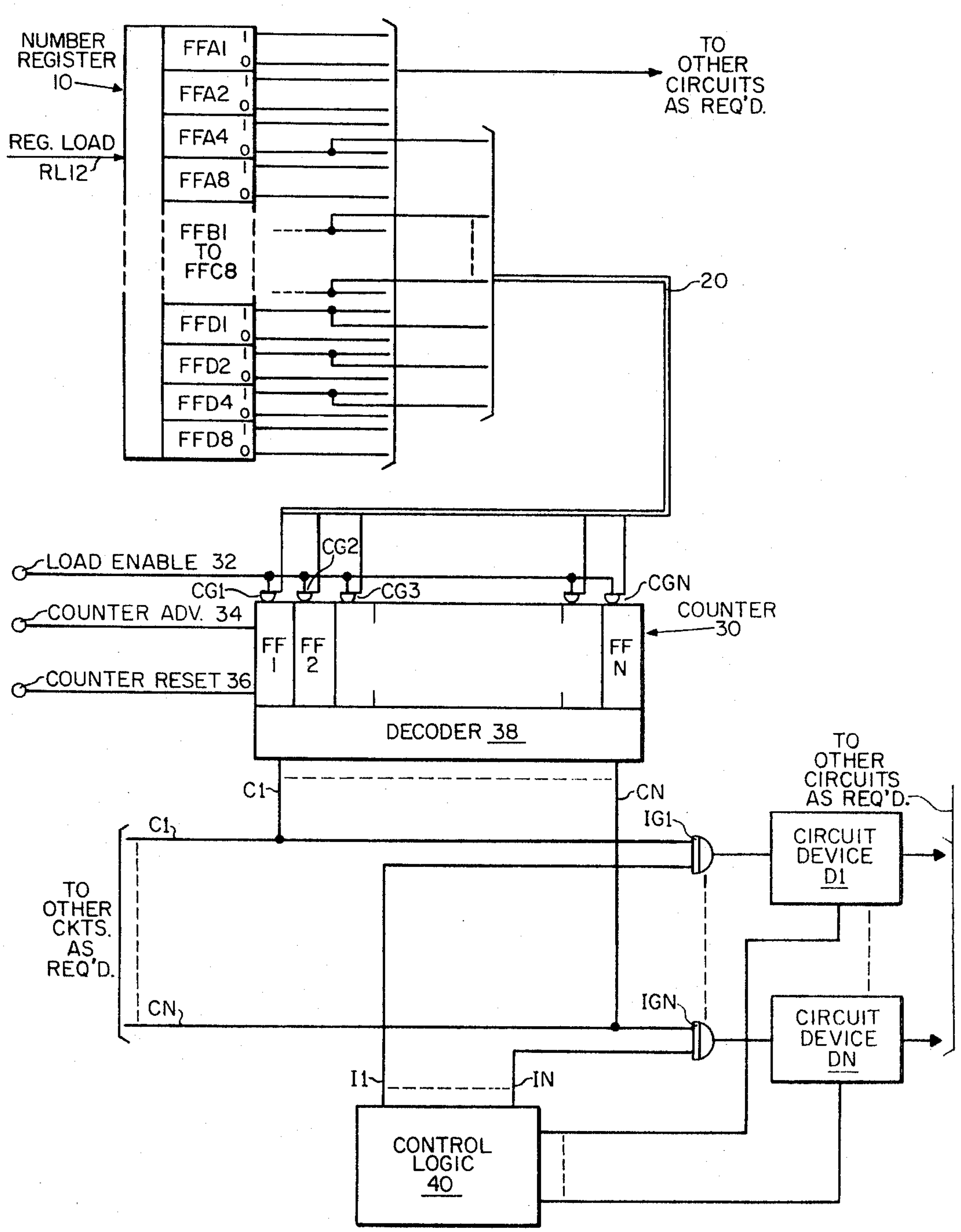
FIG. 1 is a schematic and functional block diagram of an embodiment showing the invention in a simplified form.

FIG. 1 shows a portion of a system to illustrate the basic principle of the invention in simplified form. There is shown a number register 10 comprising register loading means designated by RL12 and a plurality of flip-flops FFA1—FFD8 which store the number in binary-coded-decimal form. Each of the number-register flip-flops has two outputs which are used by other circuits in the system (not shown). Some of the flip-flop outputs of register 10 are coupled via cable 20 to counter 30. Counter 30 comprises a plurality of bistable devices in the form of flip-flops FF1—FFN and a decoder 38. The outputs from number register 10 via cable 20 are individually connected via respective coincidence gates CG1—CGN to the input of flip-flops in counter 30. In addition to the connections from cable 20 each coincidence gate CG1—CGN is provided with a load enabling lead 32 common to all said coincidence gates. Counter 30 also has a counter advance means, lead 34, and a counter reset means lead 36. Decoder 38 can be of any known configuration such as a plurality of gates for decoding the counter flip-flop outputs to provide a true output on one of the leads C1 to CN, one at a time. The outputs C1—CN are connected to the inputs of AND gates 1G1—1GN, each of which has another input from control logic 40. The outputs from gates 1G1—1GN are each connected to respective circuit devices D1—DN. There is also a connection between a control logic 40 and each of the circuit devices D1—DN. For additional details relative to control logic 40 reference may be had to U.S. Pat. No. 3,293,368, where in FIG. 47 a similar control is disclosed and labeled Coincidence Test 3104. This unit is described in the section titled Route Selector in columns 35 and 36 of the patent.

In operation, the number register 10 first receives a number via cable RL12. It should be understood that the information loaded into the number register 10 may be of any appropriate origin. This stored information is normally used by other circuitry (not shown) in the system for other required operations. Upon completion of these other operations, one of the circuit devices D1—DN is required. First the idle-busy condition of these circuit devices is relayed by the control logic 40 to the input of AND gates 1G1—1GN. The counter 30 is activated by means of lead 34 and each AND gate 1G1—1GN is scanned consecutively. A true signal from counter 30 and an idle indication on respective one of leads 11—IN enables the associated AND gate, and the idle circuit device is seized.

Assume that the counter 30 is used for other operations prior to scanning for idle circuit devices 1—N, and that the counter is reset to the idle state upon completion of this other operation. Thus, for each scanning operation the counter would start at a fixed point. This method would allow the circuit devices associated with the first counts of the counter starting from a fixed starting point to be used more often than the others.

Setting the Counter to a Random Starting Point Scanning Every

Scanning Operation

Since nearly all the consecutive operations of the system involves different information loaded to the number register 10, different flip-flops in the register 10 will set and reset. Thus, the connections from the outputs of these flip-flops via cable 20, will have different signals for each operation. In the example given in FIG. 1, each connection from number register 10 to the respective coincidence gate CG1—CGN is either "true" or "false," with the true signal enabling a coincidence gate and the false signal inhibiting a respective coincidence gate.

Prior to scanning of AND gates 1G1—1GN, a signal via load-enabled lead 32 enables coincidence gates CG1—CGN. Each coincidence gate which also has a true signal input from the number register 10 changes the state of its associated counter flip-flop. In this manner some of the flip-flops are set and some are reset. Thereby the counter is set to some random starting point. It should be noted that the selection of the number register flip-flop outputs is not restricted to any particular order. Also, dependent on the type of counter used in the system, the connection may be used to either set or reset any flip-flop in the counter.

DESCRIPTION OF THE PREFERRED EMBODIMENT

Figures 2, 4:
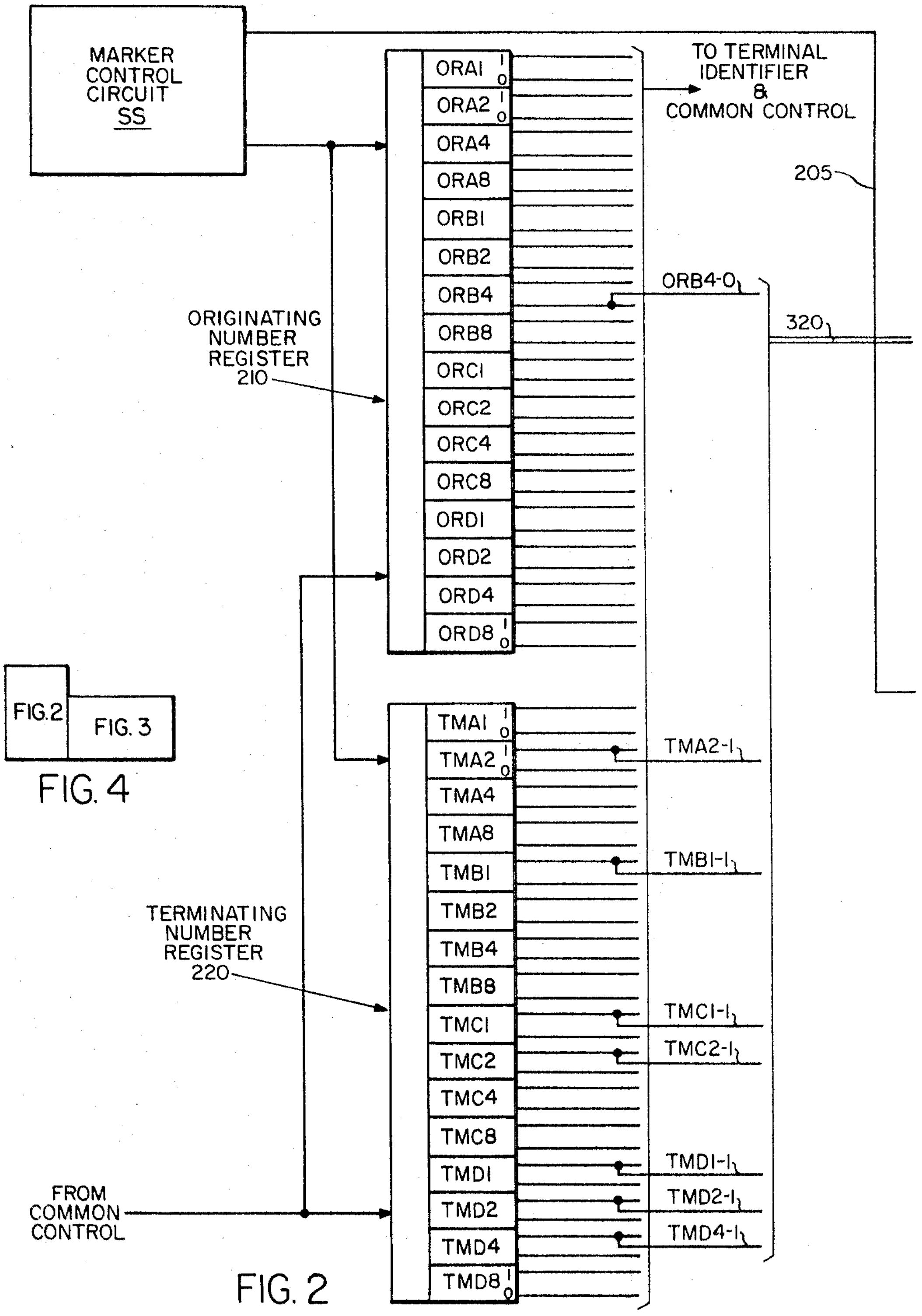
FIG. 2 is a block diagram of a portion of a marker of a preferred embodiment.
FIG. 4 shows how

FIG. 2 shows a portion of the marker of a switching system as described in U.S. Pat. No. 3,328,534 and related applications. Only the originating terminal number register 210 and the terminating terminal number register 220, which are pertinent to the invention are shown.

The basic function of the marker in the communication switching system is to provide the controls necessary to interconnect switching unit inlets and outlets via an available path through the switching network. This includes the following operations: Identification of inlet, communication with the common control circuit, path selection and the completion of connection. In the Murphy et al. system, the identification is performed by the originating number register in conjunction with other circuitry (not shown) in the marker and the identity of the inlet is relayed to the common control. The common control then determines the destination or the group of outlets to which the inlet is to be connected, and supplies this information with the inlet number to the marker.

The inlet identity is received and stored in the originating number register 210. The common control sends the number identity in four digit binary-coded-decimal form; that is, four bits for each number, which is received in the 16 flip-flops ORA1—ORD8. Thus, the number of the inlet is present at the outputs of these flip-flops. The outlet identity is received and stored in similar manner in the terminating number register in the 16 flip-flops TMA1—TMD8 therein. The long rectangular box to the left and associated with the flip-flops ORA1—ORD8 and TMA1—TMD8 represents the circuitry required to control these flip-flops.

Detailed Description of the Apparatus According to the Invention

Figure 3:
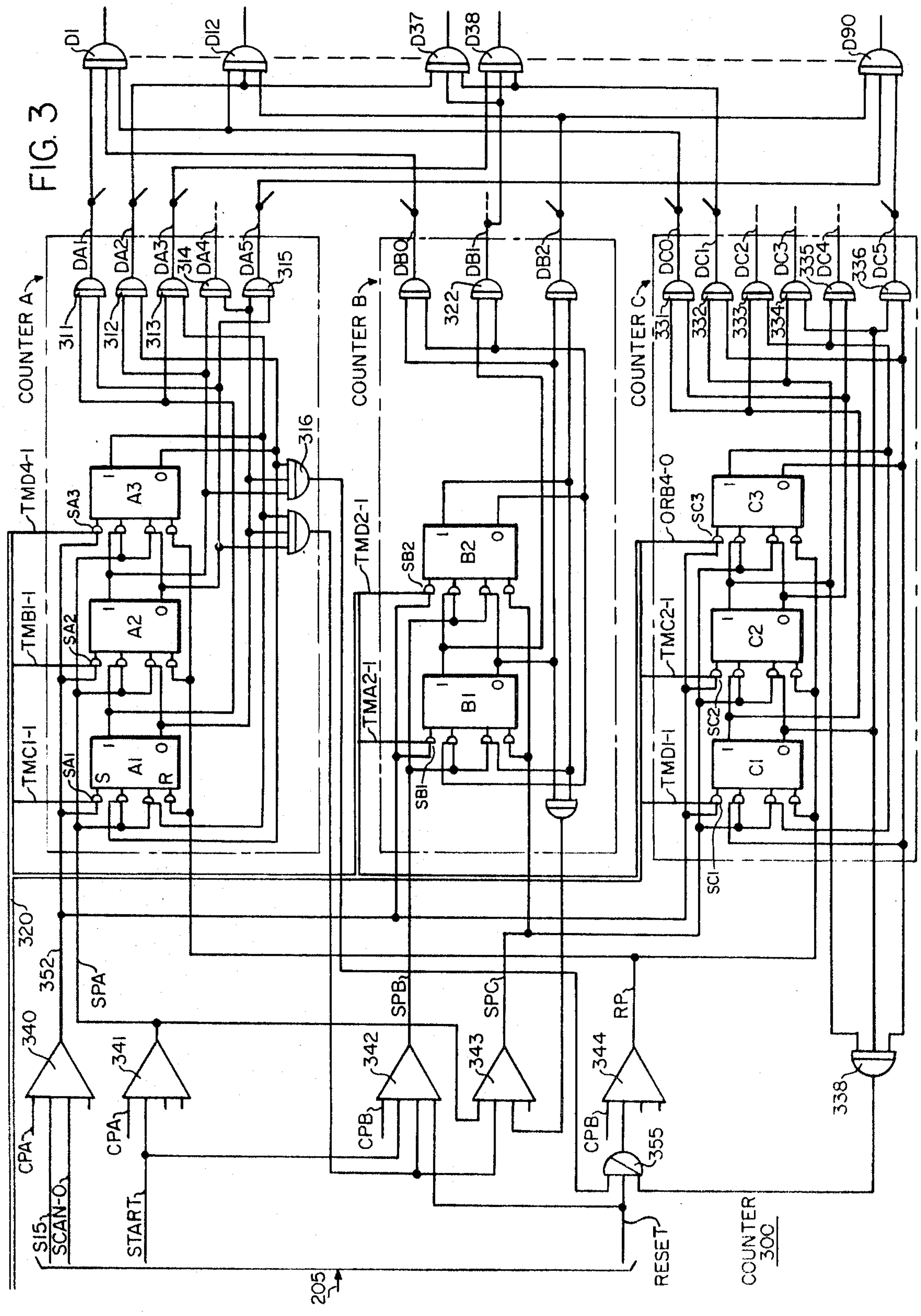
FIG. 3 is a functional block diagram of a multistage counter used in the preferred embodiment.

To illustrate the preferred embodiment of the invention the counter shown in FIG. 3 is the counter disclosed in U.S. Pat. No. 3,371,282. The counter operation as disclosed in the above patent is not affected by the invention of this disclosure; however, the starting point of the counter will vary in accordance with the calling or inlet and called or outlet terminal numbers.

Briefly, the counter in the above-mentioned patent comprises bistable devices, gated pulse amplifiers, gates and other circuits which make it possible to generate 90 true signals or counter counts in sequence. The operation of the bistable devices, gated pulse amplifiers and gates is also fully disclosed therein and therefore will not be described in this disclosure.

It should be noted, however, that the bistable devices are flip-flops which have two set coincidence gates and two reset coincidence gates. Each coincidence gate has two inputs, an AC input and a DC input. A normal counter operation requires the use of one set coincidence gate and one reset coincidence gate. The other reset coincidence gate for each flip-flop serves as a reset means for the counter; that is, all the flip-flops can be reset at the same time so that the counter rests at its idle or first count. Also shown in the above patent are gates designated D1—D90 which during the counter operation are enabled one-at-a-time providing a true signal at the respective outputs.

As shown in FIG. 3, the other coincidence gate of each flip-flop of counter 300 is provided with a DC and an AC input. Thus, set coincidence gates SA1, SA2 and SA3 of respective flip-flops A1, A2 and A3 of counter A, have DC input connections TMC1-1, TMB1-1 and TMD4-1 via cable 320 to respective flip-flops TMC1, TMB1 and TMD4 of terminating number register 220. Set coincidence gates SB1 and SB2 of flip-flops B1 and B2 of counter B have DC input connections TMA2-1 and TMD2-1 from respective TMA2 and TMD2 flip-flops in terminating number register 220. Set coincidence gates SC1 and SC2 of flip-flops C1 and C2 respectively, have input connections to flip-flops TMD1 and TMC2, and set coincidence gate SC3 of counter C has DC input connection to flip-flop ORB4 of originating number register 210. It should be noted that the DC lead designations, such as "TMC1-1" to coincidence gate SA1, indicates that the signal on that lead is false when the flip-flop is in reset stage and that the signal is true when in set state. On the other hand, the signal on lead ORB4-0 is true when the flip-flop ORB4 is reset and false when the flip-flop is set. The AC input is from the output of gated pulse amplifier 340 and via lead 352 is common to all said coincidence gates.

Detailed Operation

Assume that the inlet terminal number is such that flip-flop ORB4, in the register 210, is set and that the outlet terminal number is such that flip-flops TMA2, TMB1, TMC1, TMC2 and TMD1 are set, and flip-flops TMD2 and TMD4 are reset. Signals on leads TMA2-1, TMB1-1, TMC1-1, TMC2-1 and TMD1-1 in response to the associated set flip-flops become true, thus supplying a DC set signal to set coincidence gates of their respective flip-flops in counter 300. The signals on leads ORB4-0, TMD4-1, TMA2-1 and TMC2-1 being false inhibit respective coincidence gates at their respective DC set inputs.

When the marker advances to sequence state S15 the signal on lead S15 becomes true, and since in state S15 the marker does not perform any scanning operations, the signal on lead SCAN-0 also becomes true, so that the gated pulse amplifier 340 is enabled at its DC inputs. The signal on lead CPA is in the form of a train of ON-OFF pulses, so when the first ON pulse appears on lead CPA, after the gated pulse amplifier 340 is enabled by its DC inputs, the signal on lead 352, connected to the output of gated pulse amplifier 340, becomes true for the duration of the CPA ON pulse.

In response to true DC signals on leads TMC1-1, TMB1-1, TMA2-1, TMD1-1 and TMC2-1 and a true AC signal on lead 352 flip-flops A1, A2, B1, C1 and C2 are set. Setting flip-flops A1 and A2 in counter A enables decoding gate 312. Setting flip-flop B1 enables gate 322. Likewise setting flip-flop C1 and C2 enables gate 332 in counter C. The outputs of counters A, B and C are used to allow one of the decoding gates D1–D90 to generate a true signal. Thus a true signal at the outputs of gates 312, 322 and 332 generates a true signal at the output of decoding gate D37 or a count of 37. The subsequent ON pulses on lead CPA to the input of gated pulse amplifier 340 will not change the status of the counter 300 flip-flops since the DC inputs to respective coincidence gates will be the same. Thus the counter stops or rests at the count of 37. When the signal on lead S15 becomes false gated pulse amplifier 340 is inhibited thus removing an AC set pulse from lead 352.

When the counter is called upon for a path scanning operation the signal on START lead becomes true, supplying DC enable signal to the input of gated pulse amplifier 341. The first ON signal pulse on lead CPA to gated pulse amplifier 341 generates a true AC set pulse on lead SPA. A true AC pulse on lead SPA sets flip-flop A3. Setting flip-flop A3 generates a true signal at the output of gate 313. The counter advances to count 38; that is, the signal at the output of gate D38 becomes true. The counter operation then proceeds according to the operation described in Pat. Ser. No. 3,371,282.

Setting a counter to some random starting point also includes starting the counter from its reset position. According to the present invention this can be achieved in three different ways. One way to start the counter 300 from its reset position or from the count of one is if all the DC input connections to coincidence gates SA1—SA3, SB1, SB2 and SC1—SC3 of counter 300 flip-flops, are false. However, it is possible that most terminal numbers will have at least one flip-flop set that has connection to the counter flip-flops; therefore, most starting points will be other than from count one.

Another way the counter 300 may be set to start scanning operation from count one is when counter A flip-flops A1 and A3 are set and flip-flop A2 is reset. This indicates an unallowed condition and the output of AND gate 316 becomes true. The output of AND gate 316 is gated via OR gate 355 to the DC input of gated pulse amplifier 344 so that on the next CPB pulse signal on lead RP resets counter 300.

The third way the counter 300 is reset if the flip-flop C2 is set and flip-flops C1 and C3 are reset, the output from gate 38 gated via gate 355 and pulse CPB resets all the flip-flops in counter 300, so the counter starts at the count of one.

From the foregoing it will be apparent that applicant's arrangement of setting the counter to some random starting point prior to counter operation requires few additional connections and gating circuits in the existing system to provide a random starting point for each counter operation.

I claim:

1. In a system including a register having a plurality of bistable devices and a plurality of outputs, means to load said register, said register loaded with different data for at least any two consecutive operations, and a counter having a plurality of bistable devices for sequentially selecting on a one-at-a-time basis from a plurality of circuit devices (D1—DN), said counter having drive means for sequentially advancing the count from any count;

a circuit for setting said counter to a random starting count prior to each scanning operation comprising:

connections between said counter and only some of said plurality of register outputs, said connections being a random sampling of the outputs of said register bistable device outputs, and an enabling means to load said data via said connection to the counter bistable devices to thereby set said counter to a random starting count in accordance with a numerically unrelated portion of the data loaded into said register.

2. In a communication switching system including a switching network with a plurality of circuit terminations, and a marker for establishing a communication path through said switching network, said marker having a plurality of registers for loading terminal numbers therein with said registers including output means, a circuit for selecting one of a plurality of possible paths through said switching network, said circuit including a counter for sequentially selecting on a one-at-a-time basis from said plurality of possible paths, said counter having drive means for sequentially advancing the count from any count;

an improvement in setting said counter to a random starting count comprising:

a plurality of connections between said counter and certain ones of said plurality of registers output means, said connections being made to randomly selected bits of the information loaded into said registers, and an enabling means to load said information on said output means via said connections to the counter to thereby set said counter to a random starting count prior to each selecting operation in accordance to said randomly selected bits of the information loaded into said register.

3. The combination as claimed in claim 2, wherein said registers comprise originating and terminating registers, each comprising a plurality of bistable devices for storing a multidigit number in binary coded form, and said counter comprising a plurality of bistable devices with said drive means being a source of pulses connected to each bistable device to advance the counter one step per pulse, said counter further having a plurality of decoding means having input connections to the outputs of said register bistable devices, such that only one of said plurality of decoding means generates a signal indicative of the counter count in response to said drive means, each of said plurality of connections between said counter and said register outputs connected via a respective controlling device to the input of a numerically unrelated bistable device of said counter, with said enabling means controlling the loading of said information into said counter.